Sept. 1, 1953 W. E. MARTIN 2,650,818
CENTER SPRING MOUNTING
Filed May 24, 1949 2 Sheets-Sheet 1
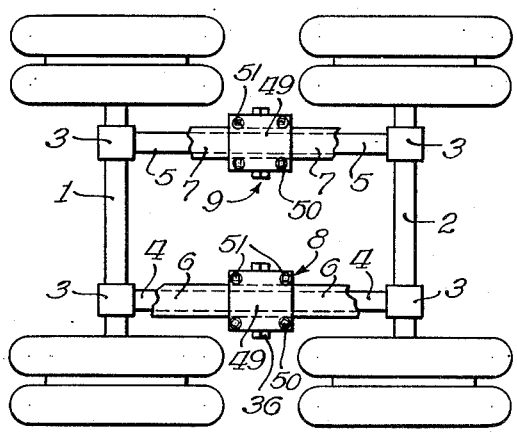
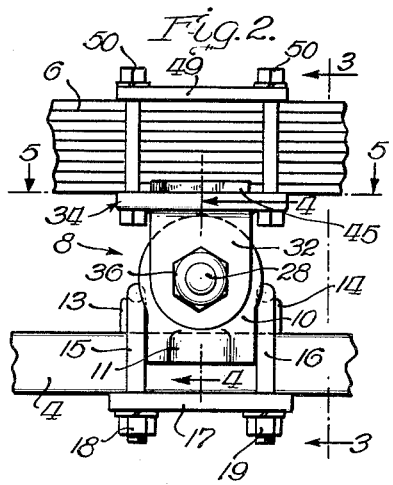
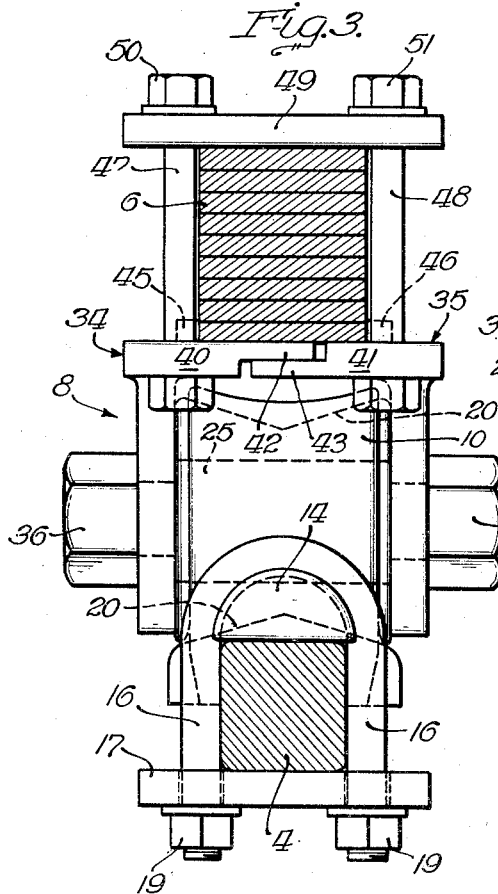
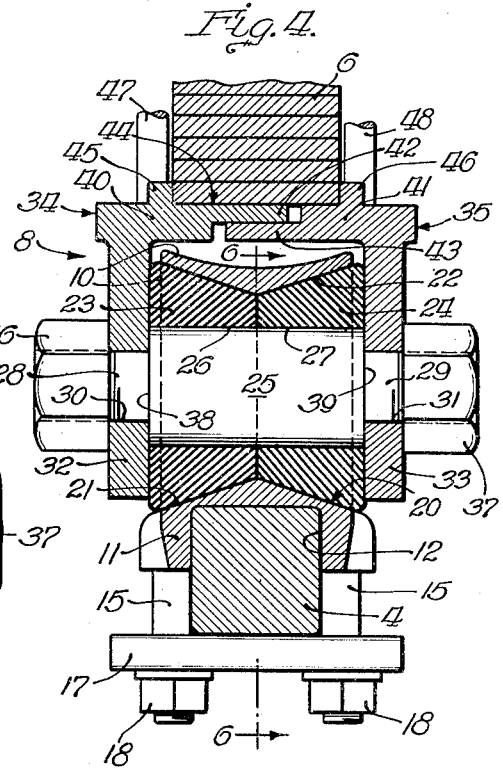
INVENTOR.
William E. Martin
BY
Eberhard E. Wetley
Atty.

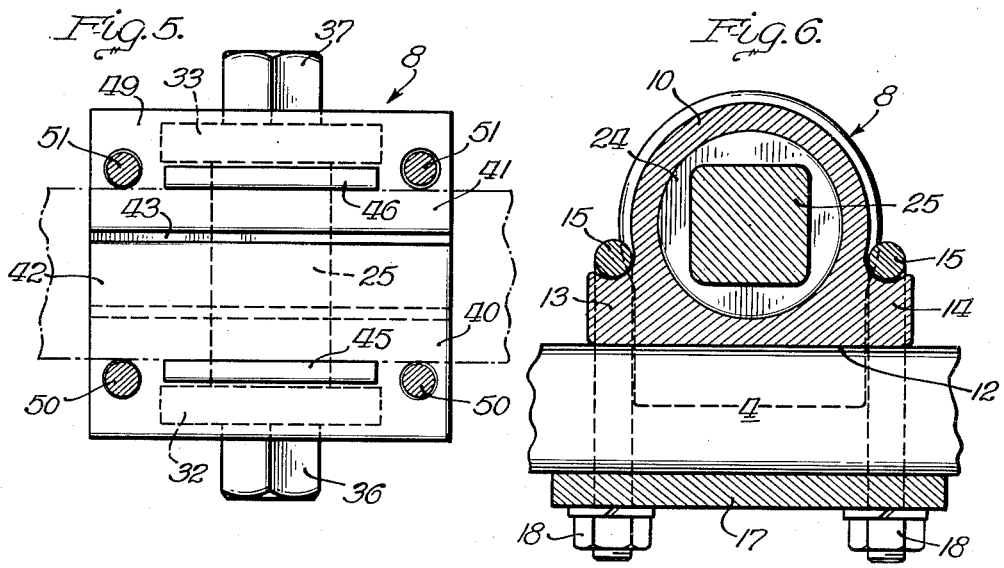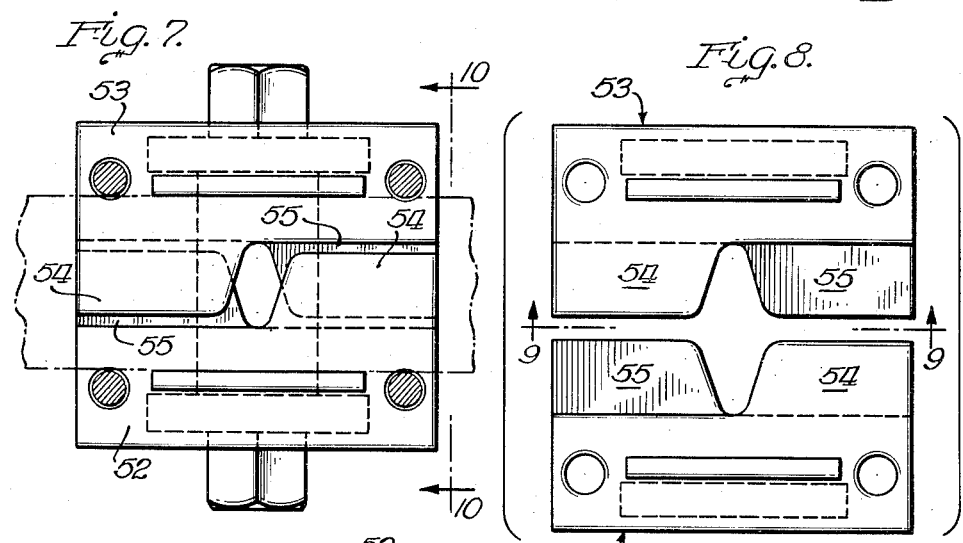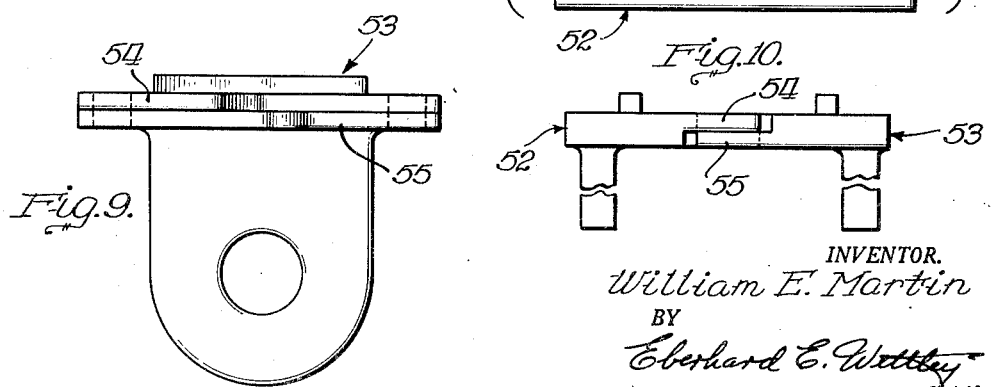

Patented Sept. 1, 1953

2,650,818

UNITED STATES PATENT OFFICE 2,650,818

CENTER SPRING MOUNTING

William E. Martin, Kewanee, Ill.

Application May 24, 1949, Serial No. 95,070

11 Claims. (Cl. 267—52)

This invention relates to a center mounting for vehicle chassis springs incorporating a separable yoke anchored to the spring and joining with the wheel carriage frame through rubber for efficient flexible operation under load cushioning conditions.

One of the main objects of this invention is to provide a universal interconnected bracket arrangement eliminating metal to metal contact at the main connection of the composite members to cushion road and load shocks and to introduce desirable flexibility to establish an efficiently operable mounting at this point of the wheel carriage for connecting the latter to the springs of a vehicle chassis.

Another object of the present invention is the arrangement featuring a mounting that can be disassembled with convenience and with little effort by the use of ordinary tools to inspect or replace the rubber parts used. The same effortless procedure pertains to spring changes or other replacements and service operations.

The invention is structurally centered in the use of coacting yokes that form a bed for the spring and which yokes straddle the wheel carriage portion of the mounting, such yokes allowing the use of conical rubber sleeves that do function to transmit the load stresses between the mounting parts and which sleeves are strong in design to adequately carry out their functions over long periods of hard usage operation. The novel yoke structure also contemplates the use of interchangeable yoke coacting sections for economical production of mountings of this kind.

Other objects and advantages pertaining to the mounting mechanism of this invention shall hereinafter appear in the following detailed description having reference to the accompanying drawings forming a part of this specification.

In the drawings:

Fig. 1 is a general plan view of a wheel carriage showing a pair of center spring mountings which connect the carriage to the main springs of a vehicle, the springs being fragmentarily illustrated;

Fig. 2 is a side elevational view of one of the mountings of this invention;

Fig. 3 is an enlarged end view of the mounting as seen along the line 3—3 of Fig. 2;

Fig. 4 is a vertical cross sectional view on a medial plane through the mounting taken substantially along the line 4—4 in Fig. 2;

Fig. 5 is a plan sectional view of the mounting as seen along the line 5—5 in Fig. 2;

Fig. 6 is a central vertical sectional view through the mounting as seen along the line 6—6 in Fig. 4;

Fig. 7 is a plan sectional view like that of Fig. 5 but illustrating a modified construction of center spring mounting;

Fig. 8 is a plan view of the coacting yoke sections used in the modified structure, the same being shown independently of other mounting parts and in separated relation;

Fig. 9 is a side view of one of the yoke sections as seen along the line 9—9 in Fig. 8; and Fig. 10 is an end view of the two yoke sections per se as seen along the line 10—10 indicated in Fig. 7.

The wheel carriage shown in Fig. 1 has wheel axles 1 and 2 connected by suitable joint structures 3 to the carriage bars 4 and 5. The center portions of the bars 4 and 5 are connected to the vehicle chassis springs 6 and 7 by the mounting units 8 and 9 of this invention, the ends of the springs 6 and 7 being connected to a vehicle chassis or body in any conventional manner.

The mounting units 8 and 9 are identical and the description thereof shall be confined to the unit 8 illustrated in Figs. 2 to 6 inclusive.

This unit has a ring housing 10 with a base 11 having a channel 12 to rest upon the bar 4, the housing being provided with end saddles 13 and 14 to receive U-bolts 15 and 16 respectively. The U-bolts 15 and 16 are made to flank the bar 4 and pass through apertures in the bearing plate 17 for the reception of nuts 18 and 19 respectively to tightly secure the ring housing to the top of the bar 4 of the chassis.

The ring housing 10 is provided with a transverse opening 20 having flaring conical seats 21 and 22 opening oppositely outwardly from the center of the opening 20 and axially thereof. The housing opening 20 is positioned on an axis at right angles to the length of the carriage bar 4. A pair of conical sleeves 23 and 24 are seated in opening 20 and meet on a medial plane at the small diameter central part of the opening 20 as best shown in Fig. 4.

A torsion stud 25 is carried in aligned apertures 26 and 27 in sleeves 23 and 24, and this stud 25 has reduced diameter threaded ends 28 and 29 which pass through holes 30 and 31 of the legs 32 and 33 of the two yoke sections 34 and 35 of the mounting unit 8. The nuts 36 and 37 are threaded on the ends 28 and 29 to tightly grip the yoke legs 32 and 33 against the shoulders 38 and 39 of the stud 25. Shoulders 38 and 39 prevent crushing and excessive distortion of the sleeves 23 and 24 and also establish the spacing of the yoke sections 34 and 35 by the leg engagement of the yoke sections with the stud shoulders which also position the legs 32 and 33 in parallel relation to each other. In addition, stud 25 is substantially square as best shown in Fig. 6 to carry the rubber sleeves 23 and 24 in fixed relation upon the stud 25. Torsional rotation of stud 25 is normally counteracted by the seated rubber sleeves due to their snug reception within the ring housing and by means of the manner of the yoke mounting of the squared stud 25.

The yoke sections 34 and 35 are flanged inwardly in coplanar relation over the ring housing as at 40 and 41 which flanges terminate in alternately offset tongues 42 and 43 respectively which are juxtaposed in overlapping relation to form a sturdy spring supporting bed 44 across the top surfaces of the two separable yoke sections. In addition, each of the top surfaces of the yoke sections are provided with longitudinal spring guides and abutments 45 and 46.

Spring 6 rests upon the yoke sections and pairs of bolts 47 and 48 to fasten the spring and mounting members together by means of the overhead bearing plate 49 and the nuts 50 and 51. Bolts 47 and 48 are arranged to flank opposite sides of the spring leaves to provide a sturdy fastening structure extending down from the upper bearing plate 49 through the yoke sections 34 and 35 to the opposite ends of the shouldered stud 25.

Upward road shocks from bar 4 through the rubber sleeves 23 and 24 are transmitted against the underside of the spring 6 through the flanges 40 and 41, and also through the tightly overlapping tongues 42 and 43. Downward load strains from the vehicle through spring 6 will be directed against the tops of the yoke sections 34 and 35 tending to cock the two yoke flanges 40 and 41 and tongues 42 and 43 downwardly toward the ring housing 10. But such cocking action is prevented through the bearing plate 49 and the bolts 47 and 48, and also by the abutments 45 and 46 simultaneously acting against opposite sides of the spring 6.

The disassembly of the mounting mechanism is obvious, and by separating the yokes after removal of the nuts 36 and 37, the stud 25 and rubber sleeves 23 and 24 can be removed from the ring housing 10 for servicing, inspection, or for other purposes requiring such separation of the mounting elements between the vehicle spring 6 and the chassis bar 4.

Although the yokes 34 and 35 described may be used together in 180 degree positions from those shown in Figs. 3 and 4, the yokes are actually left and right hand due to the tongue positions. The modified mounting and yokes shown in Figs. 7 to 10 show interchangeable yokes 52 and 53 with the same combination of mounting elements described in the first design.

These yokes 52 and 53 each have upper and lower tongues 54 and 55 offset longitudinally in the plane of the spring. With yokes of this construction they may be used interchangeably at will and submit to the same process of fabrication. The yokes are otherwise made the same as yokes 34 and 35 and are adapted to identical functions in the mounting structure.

The above description has been more specifically directed to the structures disclosed in the accompanying drawings, but certain changes and modifications are contemplated without departing from the fundamental concept of this invention. Any such structural deviations shall, however, be governed by the breadth and scope of the appended claims directed to the center spring mounting comprising the present invention.

What I claim is:

1. A center spring mounting to connect a vehicle chassis spring with a wheel carriage comprising a ring housing for connection with said carriage and having an oppositely outwardly flaring opening therein, a divided yoke for connection with said spring and having the parts thereof disposed to straddle said ring housing adjacent the flared openings thereof, a stud connecting the yoke parts and extending through said housing opening, and a coacting pair of rubber sleeves interposed between the stud and said ring housing to cushion road and load shocks, said sleeves each extending to the midportion of said sleeve opening and flaring externally outwardly to snugly nest within said ring housing opening, said stud including means to urge said yoke parts against the sleeves to force the latter into fixed frictional contact within said ring housing, and said stud being polygonal in cross section to prevent relative rotation between said sleeves and said stud.

2. A center spring mounting to connect a vehicle chassis spring with a wheel carriage comprising a ring housing for connection with the carriage, a separable two piece yoke for connection with the spring, a stud releasably connecting said two yoke pieces and extending through said ring housing, and a rubber sleeve unit interposed between said stud and said ring housing, said rubber sleeve unit projecting outwardly from said spring housing, and said two piece yoke being disposed in abutting contact with said projecting portions of said sleeve unit, said stud including shoulders thereon to limit the movements of said yoke pieces against said sleeve unit and to position the two pieces in fixed relation to each other and with respect to said ring housing, and said yoke pieces including overlapping flanges to form a bed for said connected spring with each yoke piece having abutment members thereon to engage opposite sides of the spring above said bed.

3. A mounting unit to connect a spring with a wheel carriage comprising a housing arranged for connection with said carriage, said housing having an opening therein, cushioning means in said opening including axially separable rubber members and a stud axially supporting the same, and a two piece yoke connected with the ends of said stud and confining said separable rubber members between said yoke pieces, said yoke pieces each having coplanar flanges with overlapping tongues to form a bed for the spring together with abutment members disposed to either side of said overlapping tongues, and means connected with said yoke pieces and arranged for connection with said spring to mount the latter upon said yoke bed and between said abutment members thereon.

4. A mounting unit to connect a spring with a wheel carriage comprising a housing arranged for connection with said carriage, said housing having an opening therein, cushioning means in said opening including axially separable rubber members and a stud axially supporting the same, and a two piece yoke connected with the ends of said stud and confining said separable rubber members between said yoke pieces, said yoke pieces each having coplanar flanges with overlapping tongues to form a bed for the spring together with abutment members disposed to either side of said overlapping tongues, and means connected with said yoke pieces and arranged for connection with said spring to mount the latter upon said yoke bed and between said abutment members thereon, and said yoke pieces being interchangeable and of identical configuration and design.

5. A spring mounting to connect a vehicle member with a wheel carriage member comprising a hollow housing arranged for connection with one of said members, a yoke arranged for connection with the other of said members, said yoke having relatively movable parts, coacting members on said parts to maintain said yoke parts in a given relation to each other, connecting means for securing said parts transversely of said hollow housing with said coacting members positioning said parts radially of said housing, said connecting means having a portion thereof passing through said hollow housing, and shock absorbing means interposed between said hollow housing and said connecting means for cushioning road and load shocks, said relatively movable yoke parts comprising identical and bodily interchangeable units.

6. A spring mounting to connect a vehicle leaf spring with a carriage comprising a housing arranged for connection with the carriage, a yoke arranged for connection with said spring, said yoke comprising separable legs with flanges disposed in the longitudinal plane of the spring and having overlapping parts positionable next to said spring, said flanges having portions thereof arranged for engaging the sides of said spring to limit movement of said flanges toward each other and to counteract cocking of said yoke legs under the weight of the spring supported load, and resilient means interposed between said housing and said yoke legs to counteract movement of said legs toward each other under load, said resilient means including a stud for securing said legs through said housing to further restrain said legs from relative movement under road and load shocks.

7. In a vehicle, a vehicle spring, a wheel carriage, and a center spring mounting connecting said vehicle spring with said wheel carriage comprising a ring housing having a saddle member secured to a carriage member, a yoke having spaced fastening means connected across and clamped to the spring, said yoke comprising a pair of separate and individual legs arranged in spaced cooperative relation and for relative movement therebetween, a stud securing said yoke legs and passing through said ring housing, and resilient means interposed between said ring housing and said stud to provide road and load shock cushioning means.

8. In a vehicle, a vehicle spring, a wheel carriage, and a center spring mounting connecting said vehicle spring with said wheel carriage comprising a ring housing secured to a longitudinal portion of said carriage and having a transverse opening therethrough, a yoke secured to the spring, said yoke having relatively movable legs straddling the ring housing at each side of the opening therein, a stud securing said yoke legs in transverse relation to said spring and extending through said ring housing opening, and resilient means interposed between the ring housing and said stud, said resilient means extending outwardly of said housing for surface contact with the legs, said resilient means being sandwiched between the legs of said yoke to provide road and load shock cushioning means.

9. A spring mounting to connect a vehicle member with a wheel carriage member comprising a hollow housing arranged for connection with one of said members, a yoke arranged for connection with the other of said members, said yoke having independently and relatively adjustable leg parts terminating in overlapping and relatively shiftable sections disposed adjacent the housing and in the upright median plane thereof, connecting means for transversely securing said leg parts in predetermined minimum spaced relation with respect to each other and with respect to said housing, said overlapping sections of said independently connected leg parts providing means for aligning said leg parts in a given radial plane with respect to said housing, said connecting means having a portion thereof passing through said hollow housing, and shock absorbing means interposed between said hollow housing and said connecting means for cushioning road and load shocks.

10. A spring mounting to join a vehicle member with a wheel carriage member comprising a ring housing for connection with one of said members, a yoke for connection with the other of said members, said yoke having independently shiftable sections terminating with overlapping and slidably coacting parts, a removable stud connecting said independent yoke sections, fastening means on said stud to draw said yoke sections toward each other, said stud having stop means thereon to provide a minimum approach for said yoke sections toward each other and to dispose said sections in predetermined positions transversely of said ring housing, said overlapping parts of said yoke sections functioning to align said independent sections radially of said ring housing, said stud passing through said ring housing, and shock absorbing means interposed between said ring housing and said stud for cushioning road and load shocks.

11. A resilient mounting for connecting a pair of members comprising a hollow housing having securing means connected with one of said members, a two piece yoke having securing means connected with the other of said members, said yoke pieces each comprising a leg with an offset flange arranged for radial positioning with respect to said housing, the offset flanges of the legs being arranged in oppositely offset relation respectively in a radial plane of said housing, said flanges being arranged to overlap whereby to align said legs radially of said housing, and connecting means to secure said legs in the transverse direction of said housing, said connecting means having a portion thereof disposed within the hollow housing, and shock absorbing means interposed between said hollow housing and the portion of the connecting means within said housing and extending between said legs to provide cushioning means between all of said connected members.

WILLIAM E. MARTIN.

References Cited in the file of this patent
UNITED STATES PATENTS

| Number | Name | Date |
|---|---|---|
| 207,245 | Britton | Aug. 20, 1878 |
| 1,746,217 | Jansson | Feb. 4, 1930 |
| 1,931,945 | Zerk | Oct. 24, 1933 |
| 2,017,001 | Hocking | Oct. 8, 1935 |
| 2,456,719 | Martin | Dec. 21, 1948 |